United States Patent
Xiao et al.

(10) Patent No.: US 10,024,227 B2
(45) Date of Patent: Jul. 17, 2018

(54) METHOD AND SYSTEM FOR BOOST PRESSURE CONTROL

(71) Applicant: Ford Global Technologies, LLC, Dearborn, MI (US)

(72) Inventors: Baitao Xiao, Canton, MI (US); John Erik Mikael Hellstrom, Ann Arbor, MI (US); Hamid-Reza Ossareh, Livonia, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/160,927

(22) Filed: May 20, 2016

(65) Prior Publication Data
US 2017/0335755 A1    Nov. 23, 2017

(51) Int. Cl.
| F02B 37/10 | (2006.01) |
| F02D 41/10 | (2006.01) |
| F02B 39/10 | (2006.01) |
| F02B 37/04 | (2006.01) |
| F02B 37/12 | (2006.01) |
| F02B 37/14 | (2006.01) |
| F02B 37/16 | (2006.01) |
| F02B 37/18 | (2006.01) |
| F02D 41/00 | (2006.01) |
| F02B 39/16 | (2006.01) |

(52) U.S. Cl.
CPC ............. *F02B 37/10* (2013.01); *F02B 37/04* (2013.01); *F02B 37/127* (2013.01); *F02B 37/14* (2013.01); *F02B 37/16* (2013.01); *F02B 37/18* (2013.01); *F02B 39/10* (2013.01); *F02D 41/0007* (2013.01); *F02D 41/10* (2013.01); *F02B 2037/122* (2013.01); *F02B 2039/168* (2013.01); *F02D 2200/703* (2013.01)

(58) Field of Classification Search
CPC ........ F02B 37/10; F02B 37/127; F02B 39/10; F02B 37/14; F02B 37/04; F02B 37/16; F02B 37/18; F02B 2039/168; F02B 2037/122; F02D 41/0007
USPC ............... 60/600, 602, 607–609, 612, 605.2
See application file for complete search history.

(56) References Cited

U.S. PATENT DOCUMENTS

| 6,938,420 B2 | 9/2005  | Kawamura et al. |
| 7,210,296 B2 | 5/2007  | Bolz et al.     |
| 7,530,229 B2 | 5/2009  | Akita           |
| 7,628,015 B2 | 12/2009 | Marumoto et al. |

(Continued)

OTHER PUBLICATIONS

Xiao, Baitao et al., "Methods and Systems for Boost Control," U.S. Appl. No. 14/799,342, filed Jul. 14, 2015, 35 pages.

(Continued)

*Primary Examiner* — Hoang Nguyen
(74) *Attorney, Agent, or Firm* — Julia Voutyras; McCoy Russell LLP

(57) ABSTRACT

Methods and systems are provided for controlling boost pressure in a staged engine system comprising a turbocharger and an upstream electric supercharger based on altitude. During vehicle operation at higher altitudes, where vacuum availability for wastegate actuation is limited, boost pressure may be provided by operating the electric supercharger more aggressively. The wastegate may be used for boost control once the vacuum reserve is replenished.

17 Claims, 4 Drawing Sheets

(56) References Cited

U.S. PATENT DOCUMENTS

| | | | |
|---|---|---|---|
| 7,640,912 B2* | 1/2010 | Lewis | F01N 11/007 |
| | | | 123/299 |
| 7,958,727 B2 | 6/2011 | Arnold | |
| 7,958,730 B2 | 6/2011 | Stewart | |
| 8,164,208 B2 | 4/2012 | Rosson et al. | |
| 8,176,735 B2 | 5/2012 | Komatsu | |
| 8,220,245 B1 | 7/2012 | Papandreas | |
| 9,732,684 B2* | 8/2017 | Yasui | F01N 3/208 |
| 2006/0196182 A1* | 9/2006 | Kimoto | F02B 33/44 |
| | | | 60/605.1 |
| 2009/0031723 A1* | 2/2009 | Gehrke | F02B 37/12 |
| | | | 60/603 |
| 2009/0139230 A1* | 6/2009 | Baldwin | F02B 33/40 |
| | | | 60/612 |
| 2014/0127002 A1 | 5/2014 | Joergl et al. | |
| 2014/0260241 A1 | 9/2014 | Jankovic et al. | |
| 2015/0027407 A1 | 1/2015 | Darnell | |
| 2015/0047617 A1 | 2/2015 | Benjey et al. | |
| 2015/0219030 A1* | 8/2015 | Naik | F02M 26/08 |
| | | | 60/599 |

OTHER PUBLICATIONS

Xiao, Baitao et al., "Methods and Systems for Boost Control," U.S. Appl. No. 14/942,487, filed Nov. 16, 2015, 38 pages.

Xiao, Baitao et al., "Method and System for Boost Pressure Control," U.S. Appl. No. 15/160,842, filed May 20, 2016, 49 pages.

Xiao, Baitao et al., "Method and System for Boost Pressure Control," U.S. Appl. No. 15/160,880, filed May 20, 2016, 51 pages.

* cited by examiner

METHOD AND SYSTEM FOR BOOST PRESSURE CONTROL

FIELD

The present description relates generally to methods and systems for regulating engine boost pressure in staged boosted engine systems.

BACKGROUND/SUMMARY

Engines may be operated using boosting devices, such as turbochargers or superchargers, to increase mass airflow into a combustion chamber. Turbochargers and superchargers compress intake air entering the engine using an intake compressor. Further, one or more intake charging devices may be staged in series or parallel to improve engine boost response.

One example of a multi-staged boosted engine is shown by Stewart et al. in U.S. Pat. No. 7,958,730. Therein, a multistage series turbocharger apparatus contains a low pressure turbocharger and a high pressure turbocharger, coordinated to maintain at least one operating parameter by adjusting turbocharger speeds. The low pressure turbocharger allows for quick acceleration to compensate for the slow acceleration of the high pressure turbocharger, also known as turbo lag. The compressor speed of either turbocharger may be regulated by opening and closing a corresponding wastegate. The wastegate may have active vacuum actuation for better controllability and fuel economy.

However the inventors herein have identified potential issues with such engine systems. As one example, wastegate operation may be limited during engine operation at altitude. Specifically, as the ambient (barometric) pressure drops at higher altitudes, the amount of reserve vacuum available in a pressure canister coupled to the wastegate may decrease. The issue may be exacerbated during uphill travel following downhill travel. During downhill braking, the brake system, which is also a vacuum actuator, may consume a significant amount of the reserve vacuum. As a result, during a subsequent uphill tip-in event, when wastegate closing is requested, there may not be sufficient vacuum available. This can result in the wastegate being partly closed instead of being fully closed, with a loss in transient boosted engine performance.

The inventors herein have recognized that an electric boost provided by an electric motor-driven supercharger compressor can have a substantially immediate impact on boost pressure in a staged engine system. The electric boost can be advantageously used to supplement boost during conditions when the wastegate is deficient. In one example the above issues may be at least partly addressed by a method for a boosted engine, comprising: accelerating each of a first, upstream compressor and a second, downstream compressor to provide a flow of compressed air to a piston engine, the first compressor driven by an electric motor, the second compressor driven by a turbine; and adjusting operation of the first compressor responsive to altitude of vehicle operation. In this way, electric boost may be used for boost control during conditions when wastegate vacuum is limited.

As one example, an electric supercharger including a compressor driven by an electric motor may be staged upstream of a turbocharger including a compressor driven by an exhaust turbine. A vacuum actuated wastegate valve may be coupled across the exhaust turbine. To reduce turbo lag, while the turbocharger compressor spins up, the electric supercharger may be transiently operated to provide boost pressure. In addition, during tip-in events where the wastegate vacuum is insufficient and wastegate performance is limited, such as at higher altitudes, the electric supercharger may be operated to improve boost pressure control. For example, a feedforward and a feedback gain of an electric motor of the electric supercharger may be tuned more aggressively as a function of the ambient pressure (or altitude). This may include operating the electric motor for a longer duration and/or with a higher output at higher altitudes. In addition, a bypass valve coupled across the supercharger may be held more closed for a longer duration to increase airflow through the supercharger compressor. Concurrently, the wastegate may also be operated with a higher gain tuning. The electric supercharger operation may be continued until the altitude decreases or the available reserve vacuum exceeds the amount required for the desired wastegate actuation. Thereafter, the wastegate may be closed to spin the turbine, and electric boost may be reduced or discontinued while turbocharger boost is increased.

In this way, boosted engine performance at higher altitudes can be improved. The technical effect of operating an electric supercharger to provided boosted air to an engine during conditions when a turbocharger wastegate has reduced performance is that the engine can be provided a desired boosted airflow more rapidly. By also closing an electric supercharge bypass valve more aggressively (e.g., to a higher degree of closure and for a longer duration), airflow through the supercharger, and thereby supercharger output, may be increased. As a result, time-to-torque on tip-in events at elevated altitudes can be improved. By tuning the supercharger control loop more aggressively until the vacuum deficiency at the wastegate goes away, boost pressure may be regulated faster and more accurately. Further, the wastegate control loop may be tuned more aggressively. Overall, boost pressure tracking is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
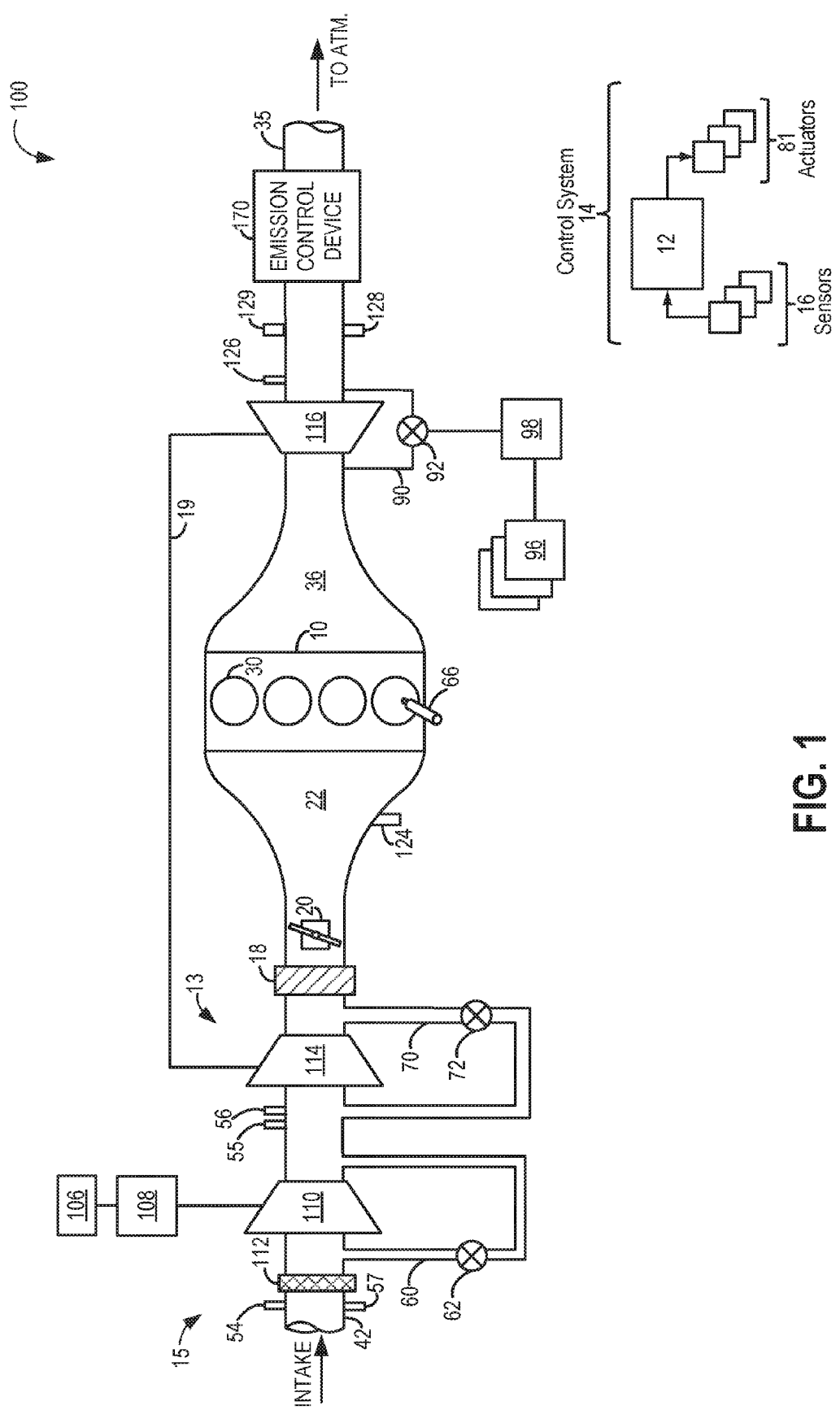
FIG. 1 shows an example embodiment of a boosted engine system having multiple staged charge boosting devices.

The following description relates to systems and methods for improving boost control in an engine system having staged boosting devices, such as in the boosted engine system of FIG. 1, wherein a turbocharger is staged downstream of an electric supercharger. A controller may be configured to perform a routine, such as the example routine of FIG. 2, to use the electric supercharger to provide a desired boost pressure during conditions when the vacuum available for actuating a wastegate valve of the turbine is limited, such as during engine operation at higher altitudes. An example boost control operation coordinating adjustments across the electric supercharger and the wastegate valve is shown with reference to FIGS. 3A-3B. In this way, transient boost response at higher altitudes may be improved.

FIG. 1 schematically shows aspects of an example engine system 100 including an engine 10. Engine 10 may be coupled in a propulsion system, such as an on-road vehicle.

In the depicted embodiment, engine 10 is a boosted engine including multiple, staged boosting devices. Specifically, engine 10 includes a first boosting device 15 staged upstream of a second boosting device 13. The configuration results in a second compressor 114 (of the second boosting device) being positioned in the engine intake passage 42 downstream of a first compressor 110. In the present example, the second boosting device is a turbocharger 13, while the first boosting device is an electric supercharger 15. The downstream turbocharger 13 may be capable of producing a higher boost pressure than supercharger 15. Herein, the downstream compressor is larger than the upstream compressor. For example, the downstream turbocharger compressor may have larger inertia, larger flow area, etc., and therefore may be able to provide a larger amount of boosted pressure for a longer duration as compared to the upstream compressor of the supercharger.

Electric supercharger 15 includes first compressor 110 driven by electric motor 108. Motor 108 is powered by an on-board energy storage device, such as system battery 106. The electric motor 108 is operated to provide an output (e.g., a motor speed) based on a desired boost pressure. For example, the electric motor may be spun to increase the speed of rotation of (accelerate) the first compressor. The first compressor 110 may be decelerated by reducing the motor speed of the electric motor 108, such as by reducing power supplied to the motor from the battery. The second compressor 114 is driven by an exhaust turbine 116.

Fresh air is introduced along intake passage 42 into engine 10 via air cleaner 112. The air then flows to the first compressor 110. Air compressed by the first compressor 110 is then delivered to the second compressor 114. During selected conditions, as elaborated below, air may bypass supercharger 15 and be directed to turbocharger 13 through first compressor bypass 60 by adjusting the opening of an electric supercharger bypass valve (ESBV) 62.

Turbocharger 13 includes second compressor 114 driven by an exhaust turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Fresh air received at the compressor inlet of second compressor 114 is introduced into engine 10. Air compressed by second compressor 114 may be recirculated from the outlet to the inlet of compressor 114 through second compressor bypass 70 by adjusting the opening of a compressor recirculation valve (CRV) 72. CRV 72 may be a continuously variable valve and increasing the opening of the recirculation valve may include actuating (or energizing) a solenoid of the valve. In one example, CRV 72 may be opened to recirculate boosted intake air to reduce compressor surge at second compressor 114.

One or both of valves 62 and 72 may be continuously variable valves wherein a position of the valve is continuously variable from a fully closed position to a fully open position. Alternatively, compressor recirculation valve 72 may be configured as a continuously variable valve while compressor bypass valve 62 is configured as an on-off valve.

As shown in FIG. 1, second compressor 114 is coupled, through charge-air cooler (CAC) 18 (herein also referred to as an intercooler) to throttle valve 20. Throttle valve 20 is coupled to engine intake manifold 22. From the second compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the second downstream compressor is a turbocharger compressor while the first upstream compressor is a supercharger compressor. However, other combinations and configurations of boosting devices may be possible.

One or more sensors may be coupled to an inlet of second compressor 114 (as shown) and/or first compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of compressor 114 and compressor 110, for determining a composition and condition of aircharge entering the compressor. These sensors may include, for example, manifold air flow sensor 57 (for estimating a mass flow of charge entering the compressor), and barometric pressure sensor 54 (for estimating an ambient pressure or barometric pressure (BP) of charge entering the compressor). As such, the output of the barometric pressure sensor may reflect the altitude of vehicle operation, the BP dropping as the altitude increases.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied fuel one or more fuels, such as gasoline, alcohol fuel blends, diesel, biodiesel, compressed natural gas, etc., via fuel injector 66. Fuel injector 66 may be configured to supply fuel to the combustion chambers via direct injection, port injection, throttle valve-body injection, or any combination thereof. In the combustion chambers, combustion may be initiated via spark ignition and/or compression ignition.

Exhaust from the one or more exhaust manifold sections is directed to turbine 116 to drive the turbine, which in turn drives second compressor 114. When increased turbine torque is desired (such as when increased boost pressure is desired from second compressor 114), wastegate valve 92 (herein also referred to as "wastegate") coupled in wastegate passage 90 may be actuated to a more closed position (e.g., fully closed) to direct a larger portion of the exhaust flow through the turbine. Likewise, when reduced turbine torque is desired, wastegate valve 92 may be actuated to a more open position (e.g., fully open) to dump at least some exhaust pressure from upstream of the turbine to a location downstream of the turbine via wastegate passage 90.

In the depicted example, wastegate valve 92 is vacuum-actuated and is coupled to vacuum source 98. In one example, vacuum source 98 is a vacuum canister. Specifically, wastegate valve actuation is achieved using vacuum from vacuum source 98. As such, the engine may include one or more additional vacuum actuators 96 that are actuated using vacuum from vacuum source 98. The one or more additional vacuum actuators 96 may include, for example, a brake booster for braking vehicle wheels, a canister purge valve for purging fuel vapors from a fuel system canister, auxiliary systems, etc. As such, the amount of reserve vacuum available in the vacuum source may be affected by the altitude of vehicle operation, the level of vacuum available in the vacuum source falling as the altitude increases (that is, as the BP drops). A pressure sensor, or vacuum sensor (not shown) may be coupled to the vacuum source for estimating an amount of vacuum available for actuating the various vacuum actuators and wastegate valve. Alternatively, the vacuum level may be inferred based on engine operating conditions and actuator usage.

The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 110, second compressor 114, or both.

During selected conditions when there is an increase in driver torque demand, such as during a tip-in when going from engine operation without boost to engine operation with boost, turbo lag can occur. This is due to delays in spin-up of the turbine driving the second compressor 114. To reduce this turbo lag, while the turbine is spinning up, supercharger 15 may be enabled. Specifically, the wastegate may be closed to direct more exhaust flow through the turbine. Concurrently, while turbine 116 spins-up, the desired boost pressure can be provided using electric boost from the upstream supercharger compressor 110. Enabling the supercharger includes drawing energy from battery 106 to spin motor 108, to thereby accelerate first compressor 110. The electric motor output (e.g., speed) may be selected to provide a first compressor speed that generates the desired boost pressure. In addition, bypass valve 62 may be closed so as to enable a larger portion of air drawn into the intake passage to be flowed through and compressed by first compressor 110. Due to its smaller size, first compressor 110 can be rapidly spun up, enabling a transient positive boost pressure to be provided in response to a sudden increase in boost demand. However, due to the limited charge of the system battery, the first compressor can only be rotated for a short duration during which the turbine needs to be spun up. While the first compressor is accelerating, bypass valve 62 may be intermittently opened based on the motor speed (or the first compressor speed) to reduce electric boost overshoot downstream of the first compressor and upstream of the second compressor can be addressed. When the turbine has sufficiently spun up, and is capable of driving second compressor 114, the first compressor may be decelerated by disabling motor 108. In addition, bypass valve 62 may be opened so as to enable a larger portion of intake air to be directed to second compressor 114 while bypassing first compressor 110.

As such, since wastegate valve 92 is vacuum actuated, there may be conditions when boost demand increases but the wastegate valve cannot be actuated closed due to insufficient vacuum reserve at the vacuum source. For example, during vehicle operation at higher altitudes, the vacuum availability nay be reduced due to the lower barometric pressure. The issue may be exacerbated if the wastegate valve actuation is required immediately after actuation of another vacuum actuator. As an example, during downhill travel at high altitudes, vacuum may be used for downhill braking. During a tip-in at a subsequent uphill travel, there may be insufficient vacuum available for wastegate valve actuation to a fully closed position. If the insufficient vacuum is used to actuate the wastegate valve to a partially closed position, transient engine performance may be degraded. During such conditions, as elaborated at FIG. 2, electric boost may be used to provide a transient boost pressure while the vacuum reserve is replenished. Specifically, the wastegate valve may not be actuated when there is insufficient vacuum (e.g., the wastegate valve may remain open) and instead the electric supercharger may be enabled by drawing energy from battery 106 to spin motor 108 to thereby accelerate first compressor 110. The electric motor output (e.g., speed) may be selected to provide a first compressor speed that generates the boost pressure to meet the driver demand. In addition, bypass valve 62 may be closed so as to enable increased air flow through the first compressor. The driver demand may be met at this time via the supercharger. Concurrently, the vacuum source may be replenished. Once there is sufficient vacuum for the required wastegate actuation, the wastegate may be actuated closed and the turbine may be spun-up. Once the turbine speed is high enough to support the rotation of the second compressor 114, the first compressor 110 may be decelerated and the driver demand may thereafter be met via the turbocharger.

Figure 2:
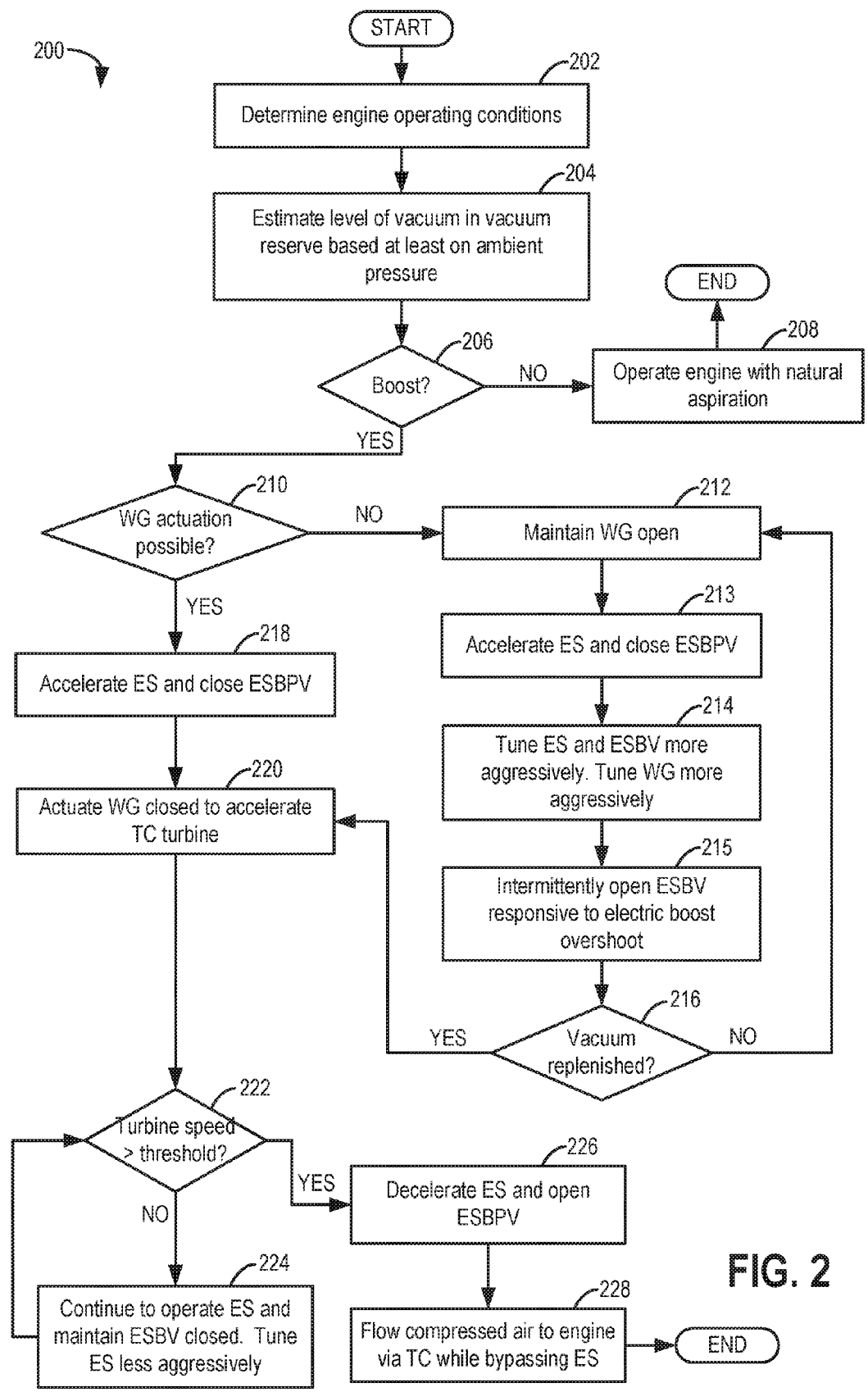
FIG. 2 shows a high level flowchart illustrating a routine that may be implemented to regulate engine boost pressure in an engine system containing an electric supercharger and a turbocharger.

A gain tuning of the supercharger compressor may also be adjusted based on the altitude of vehicle operation, as elaborated with reference to FIG. 2. For example, when the vacuum available for wastegate actuation is limited, such as when there is an increase in driver demand at higher altitudes, the supercharger operation may be controlled (including both feed-forward and feedback components of supercharger boost control) with a higher gain tuning (e.g., higher than default) to reduce the boost error more quickly. This may include operating the electric motor of the supercharger for a longer duration and/or with a higher output speed. In addition, while accelerating the first compressor of the supercharger, the tuning of the wastegate may also be adjusted with a higher (e.g., higher than default) gain tuning so that the wastegate may be tuned more aggressively during electric supercharger operation.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, BP sensor 54, exhaust temperature sensor 128, exhaust pressure sensor 129, compressor inlet temperature sensor 55, compressor inlet pressure sensor 56, and MAF sensor 57. Other sensors such as additional pressure, temperature, air/fuel ratio, and composition sensors may be coupled to various locations in engine system 100. The actuators 81 may include, for example, actuators for throttle 20, compressor recirculation valve 72, ESBV 62, electric motor 108, wastegate valve 92, fuel injector 66, and vacuum actuators 96. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as the example control routine described herein with regard to FIG. 2. As one example, the controller 12 may receive input from a barometric pressure sensor and a pressure sensor coupled to the vacuum source. Then, responsive to a driver demand, the controller may adjust the output of the electric motor of the supercharger based on an indication of low vacuum availability (from the pressure sensor) and high altitude (from the BP sensor) to provide the driver demand.

In this way, the components of FIG. 1 enables an engine system, comprising: an engine having an intake; a first intake compressor driven by an electric motor, the motor powered by a battery; a second intake compressor driven by an exhaust turbine, the second compressor positioned downstream of the first compressor along the intake; a bypass including a bypass valve coupled across the first compressor; a wastegate including a vacuum-actuated wastegate valve coupled across the exhaust turbine, the wastegate valve coupled to a vacuum source; a barometric pressure sensor for estimating an ambient pressure; and a controller. The controller may be configured with computer readable instructions stored on non-transitory memory for: in response to driver demand when the ambient pressure is lower, estimating a wastegate valve actuation required to meet the driver demand; estimating a vacuum level in the vacuum source required to provide the wastegate valve actuation, the vacuum level estimated based on the driver demand and further based on the ambient pressure; accelerating the first compressor with the wastegate valve not actuated and the bypass valve closed to meet the driver demand until the vacuum source is above the estimated vacuum level; and then decelerating the first compressor, opening the bypass valve, and actuating the wastegate valve. As one example, accelerating the first compressor may include feed-forward and feedback adjusting an operation of the electric motor with a higher than default gain tuning to increase an output of the electric motor to a higher level for a longer duration, and wherein actuating the wastegate valve includes actuating the wastegate valve to a more closed position. The controller may include further instructions for: in response to driver demand when the ambient pressure is higher, accelerating the first compressor with the bypass valve closed and the wastegate valve actuated open to meet the driver demand until a turbine speed is above a threshold speed; and then decelerating the first compressor, opening the bypass valve, and increasing a speed of the second compressor with the wastegate closed to increase airflow to the engine. The controller may include further instructions for: in response to a boost pressure overshoot while accelerating the first compressor, intermittently opening the bypass valve.

Turning now to FIG. 2, shows an example routine 200 for operating a staged boosted engine system having an upstream supercharger compressor coupled to a downstream turbocharger compressor. Responsive to changes in engine boost demand, the routine may adjust the output of the upstream supercharger based on ambient pressure. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. As one example, the controller may send a signal to an electric motor coupled to the first, upstream compressor to accelerate the compressor and thereby increase a boost pressure. In the present example, the first compressor is a supercharger compressor while the second compressor is a turbocharger compressor, the first compressor positioned upstream of the second compressor in the intake passage.

At 202, the method includes determining engine operating conditions, such as engine speed, pedal position, operator torque demand, ambient conditions (ambient temperature, ambient or barometric pressure, ambient humidity), engine temperature, etc. At 204, the method includes estimating the level of vacuum available in the vacuum reserve (or vacuum source, such as a vacuum canister) based on the engine operating conditions, including at least based on ambient pressure. The level of vacuum may be further based on prior actuation of engine vacuum actuators. Further still, the level of vacuum may be based on the output of a pressure sensor coupled to the vacuum canister.

At 206, based on engine operating conditions, it may be determined if boost pressure is required. In one example, boost may be required at mid-high engine loads. In another example, boost may be required in response to an operator pedal tip-in or increase in driver torque demand. If boost is not required, such as when the engine load is low or the driver torque demand is low, the method moves to 208 wherein the engine is operated with natural aspiration and the method ends.

If boost is required, then at 210, the method includes determining if wastegate actuation is possible. As such, the wastegate valve may be actuated using vacuum drawn from the vacuum source. Thus in one example, wastegate actuation may be possible if the vacuum level in the vacuum source (as estimated at 204) is above a threshold. The threshold may be based on the altitude of vehicle/engine operation, the threshold lowered as the altitude increases. The threshold may be further based on the amount of wastegate actuation required. For example, based on the boost demand, the controller may determine a degree of wastegate actuation (herein a degree of wastegate closure) required to spin up the turbocharger turbine. The controller may then calculate an amount of vacuum required for the determined degree of wastegate actuation and adjust the threshold accordingly. The controller may further compare the required amount of vacuum to the available vacuum to determine if the required wastegate actuation is possible. If the available vacuum is more than the required amount, wastegate actuation is possible. Else if the available vacuum is less than the required amount, wastegate actuation is not possible. In another example, the amount of vacuum available may not no sufficient if the amount of wastegate actuation required is larger (such as responsive to a larger boost demand).

If wastegate actuation is not possible, at 212, the wastegate is not actuated. For example, the wastegate may be maintained open. At 213, the method includes in response to the increase in driver demand, accelerating the first compressor (of the ES) staged upstream of the second compressor (of the TC) to provide a flow of compressed air to the piston engine. Herein the first compressor is driven by an electric motor while the second compressor is driven by an exhaust turbine. The method may further include closing an electric supercharger bypass valve (such as ESBV 62 of FIG. 1) coupled in a bypass across the first compressor to increase airflow through the first compressor. By enabling the electric supercharger (ES) and closing the bypass valve, the electric supercharger can be used to rapidly provide transient boost pressure responsive to the driver demand during conditions when there is insufficient vacuum for actuating the wastegate. While accelerating the first compressor, the wastegate valve coupled in the wastegate passage across the turbine is held in the more open position. As such, if the wastegate is not actuated (or only partially actuated), the turbine cannot spin up to a desired speed, and cannot drive the second compressor. As a result, transient response can be degraded. By relying on the supercharger to provide boost during those conditions, the transient boost response is improved.

Accelerating the first compressor includes spinning the first compressor via the electric motor using power drawn from a battery. For example, the first compressor may be spun by adjusting an electromechanical actuator coupled to an electric motor of the supercharger to rotate the motor at a higher speed by sending a control signal from the controller to the actuator. The first compressor is accelerated at a speed responsive to the boost demand (or the increase in boost demand) while the ESBV coupled across the electric supercharger is held closed to flow all the intake air through the first compressor. In this way, compressed air is provided to the engine via the first compressor. At this time, boost demand may be met via the supercharger compressor alone.

At 214, the method includes adjusting a tuning of the first compressor, as well as a tuning of the bypass valve, the tuning adjusted based on the altitude of vehicle operation. In particular, the first compressor and the ESBV may be tuned more aggressively at high altitude operation. The altitude may be inferred based on the output of the BP sensor. The adjusting may include operating the first compressor with a higher than default gain tuning when the altitude is higher (e.g., higher than a threshold altitude), and with the default tuning when the altitude is lower (e.g., lower than the threshold altitude). In particular, a more aggressive feed-forward and feedback gain may be applied and a more conservative turbocharger capability model may be used. As an example, accelerating the first compressor more aggressively may include feed-forward and feedback adjusting an operation of the electric motor driving the first compressor with a higher than default gain tuning to increase an output of the electric motor to a higher level and/or to operate the electric motor for a longer duration. Operating the first compressor with a higher than default gain tuning when the altitude is higher may include one or more of operating the electric motor with a higher output, operating the electric motor for a longer duration, accelerating the first compressor with a higher rate of acceleration, and accelerating the first compressor to a higher speed at the higher altitude.

In addition, the controller may also operate the wastegate valve with a higher than default gain tuning while accelerating the first compressor, if vacuum is available for actuating the wastegate.

At 215, the method includes intermittently opening the bypass valve while maintaining the wastegate valve closed in response to boost pressure overshoot while accelerating the first compressor. That is, the ESBV is opened to address electric boost overshoot. Electric supercharger boost overshoot may be confirmed if it is determined that the boost pressure downstream of the electric supercharger and upstream of the turbocharger compressor is higher than a desired boost pressure. The inventors herein have recognized that aggressive use of the electric supercharger can be advantageously used to reduce time to torque and turbo lag. However, the same aggressive use can also cause the actual boost pressure to overshoot the desired boost pressure. This overshoot can be addressed using adjustments to the ESBV opening. If the electric supercharger boost pressure is higher than the desired pressure, electric supercharger boost pressure can be controlled by increasing the opening of the ESBV to reduce airflow through the first compressor. In one example, the ESBV is transiently moved to a fully open position to reduce the boost overshoot. In an alternate example, the ESBV is partially opened. As such, due to hardware limitations, it may not be possible to brake the electric motor coupled to the supercharger. Therefore, by increasing the ESBPV opening responsive to the boost pressure overshoot, airflow through the electric supercharger compressor can be quickly reduced, enabling the boost pressure provided by the electric supercharger to be substantially immediately reduced. While the ESBPV is opened to lower the electric supercharger boost pressure to the desired boost pressure, the electric supercharger may also be decelerated, for example to a compressor speed capable of providing the desired boost pressure without less overshoot. In this way, using a combination of adjustments to the electric supercharger compressor speed and the ESBV opening, a target boost pressure can be reached faster and with fewer boost errors.

In an alternate example, where the electric supercharger includes hardware for braking, the first compressor may be decelerated responsive to the boost overshoot by applying a negative torque through the electric motor, such as by using magnetic brakes.

It will be appreciated that while the depicted example suggests accelerating the first compressor in response to wastegate valve actuation not being possible, in alternate examples, first compressor operation may be enabled responsive to the presence of a sustained deficiency in the wastegate position. For example, based on the boost demand, the controller may determine a desired wastegate position. In addition, based on the vacuum availability in the vacuum source and the ambient pressure, the controller may determine an actual wastegate position achievable using the available vacuum. If there is a deficiency (that is, desired_wastegate_position—actual_wastegate_position is higher than a threshold), then the first compressor may be enabled.

While the first compressor is used to meet the driver demand, the vacuum source may be replenished. From 215, the method moves to 216 to determine if the vacuum source has been sufficiently replenished and if wastegate actuation is now possible. If not, the method returns to 212 and continues to accelerate the first compressor and use electric boost to meet driver demand until the vacuum level in the vacuum source is above the threshold. That is, first compressor operation may remain enabled as long as there is a deficiency in the wastegate position If vacuum has been replenished, such as after the vacuum level in the vacuum source is above the threshold, the method moves to 220 wherein the routine includes actuating the wastegate valve to a less open position to drive a larger portion of exhaust air through the turbocharger turbine and accelerate the turbocharger turbine. By reducing the opening of the wastegate, the exhaust mass flow through the turbine is increased, which in turn expedites spinning of the turbine, which in turn accelerates the (second) turbocharger compressor. In one example, once sufficient vacuum is available, the wastegate may be actuated to the desired position based on the driver demand. For example, the wastegate valve may be actuated fully closed, thereby expediting turbine spin-up. As such, while the turbine is spinning up, the first compressor may continue to be operated to provide the boost demand.

Returning to 210, if wastegate actuation is possible due to sufficient vacuum being available to actuate the wastegate to the desired position (based on the driver demand), then optionally at 218, the electric supercharger may be enabled to provide a transient boost response. For example, the electric supercharger may be enabled during conditions when the boost demand is received while the turbine is not spinning and the second compressor is not enabled, such as when the boost demand is larger, or when the boost demand is from an unboosted condition (e.g., a tip-in from no boost to boost). As discussed earlier, the smaller sized electric supercharger can be quickly accelerated to provide a transient boost pressure until the turbine is spun up and the turbocharger compressor is able to provide the desired boost pressure. Use of the electric supercharger may be limited by the capacity (e.g., state of charge) of the battery used to spin the electric motor of the electric supercharger. Therefore, the electric supercharger may be used to provide a quick but transient amount of positive boost pressure while the turbocharger turbine spins up to drive the larger turbocharger compressor. Also at 218, the ESBV may be closed, or moved to a more open position to direct a larger air flow through the first compressor.

However, in other examples, the turbine may already by spinning and the second compressor may already be enabled. During such conditions, the electric supercharger may not be enabled. For example, the electric supercharger may remain disabled and the ESBV may be held open during conditions when the boost demand is received while the turbine is already spinning and the second compressor is enabled, such as when the boost demand is smaller, or when the boost demand is from a boosted condition (e.g., a tip-in from lower boost to higher boost). During such conditions, boost assist from the first compressor is not required.

While accelerating the first compressor, as previously discussed at 215, the ESBV may be intermittently opened in the event of electric boost over-shoot due to the aggressive use of the electric supercharger for reducing time to torque and turbo lag.

At 220, the wastegate valve coupled across the exhaust turbine of the turbocharger may be actuated closed (or the opening may be reduced) to drive a larger portion of exhaust air through the turbocharger turbine, thereby expediting turbine spin-up.

At 222, it is determined whether the turbocharger turbine speed is greater than a threshold speed such as above a threshold speed where the turbocharger is able to sustain the boost demand. If not, then while the turbine continues to spin up, operation of the first compressor (of the supercharger) is maintained at 224, with the electric supercharger compressor continuing to meet the boost demand. In addition, the ESBV is held closed (for example, fully closed), and the routine ends.

If the turbocharger turbine speed is above the threshold speed, then at 226, the electric supercharger is decelerated and the opening of the ESBV is increased. In one example, the ESBV is moved to a fully open position so that intake airflow can be directed to the turbocharger compressor while bypassing the supercharger compressor. As the turbocharger is able to sustain the boost demand, the electric supercharger may be disabled, so as to avoid draining the battery powering the motor of the electric supercharger. By opening the ESBV, the electric supercharger may be bypassed, allowing the electric supercharger to decelerate without restricting airflow through the intake pathway.

At 228, the method includes flowing intake air compressed by the second, downstream compressor (the turbocharger compressor) into the engine while bypassing the first, upstream compressor (the supercharger compressor). Herein, the second compressor may be accelerated via the turbine. At this time, boost demand may be met via the turbocharger compressor alone. The method then ends.

In the depicted example, the electric supercharger is decelerated once there is sufficient vacuum for wastegate valve actuation and after the turbine speed is high enough to sustain the boost demand. However in other examples, after the vacuum level in the vacuum source is above the threshold, the controller may decelerate the first compressor, open the bypass valve, and actuate the wastegate valve to a less open position, a degree of opening of the wastegate valve based on the (increase in) driver demand.

In this way, an electric supercharger may be used to improve the control of a vacuum actuated wastegate valve at higher altitudes, thereby improving boost control at lower barometric pressures.

Figure 3A:
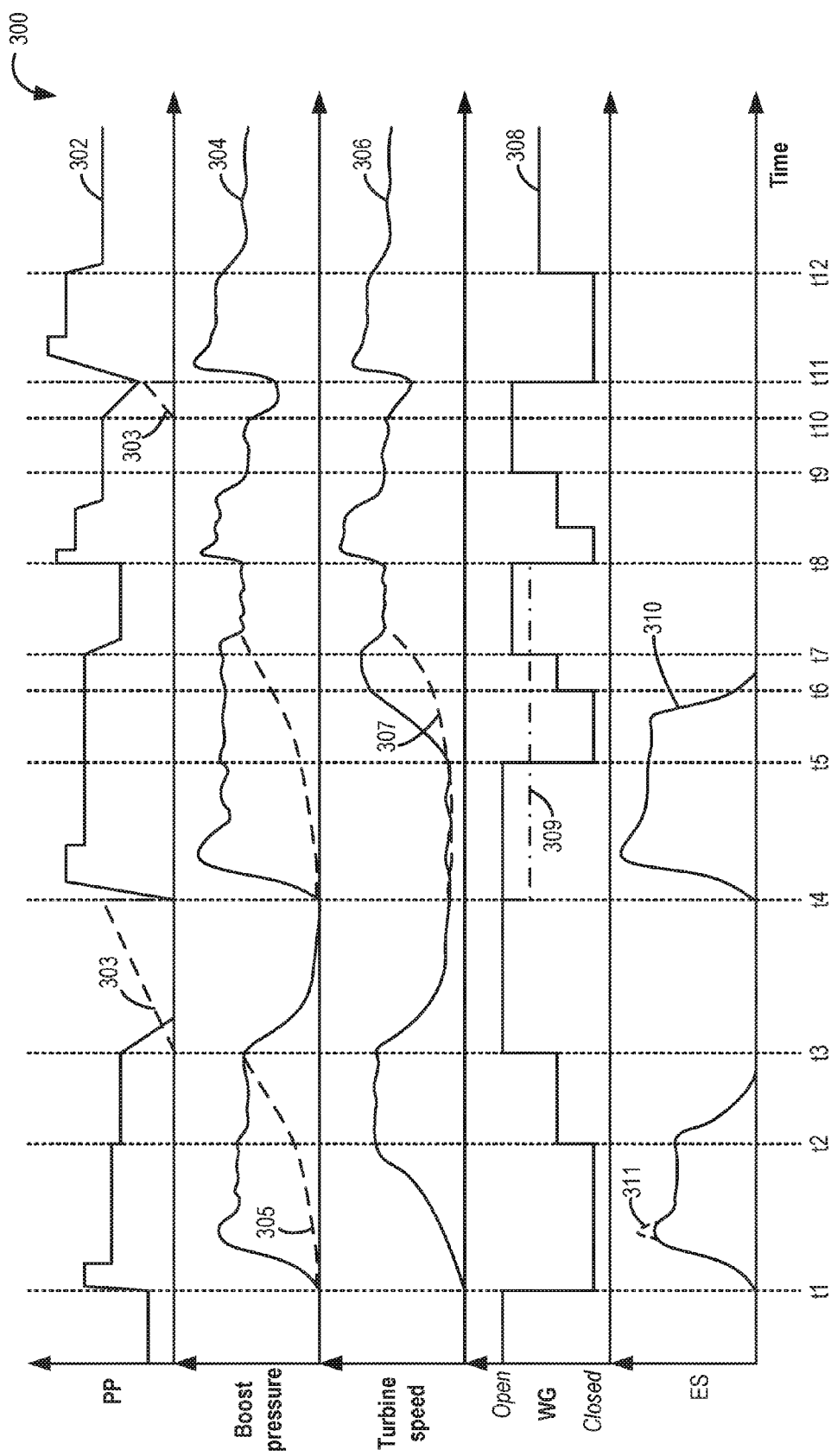
FIGS. 3A-3B show example adjustments that may be used to improve transient boot response using an electric supercharger during vehicle operation at higher altitudes where wastegate operation is limited.
Figure 3B:
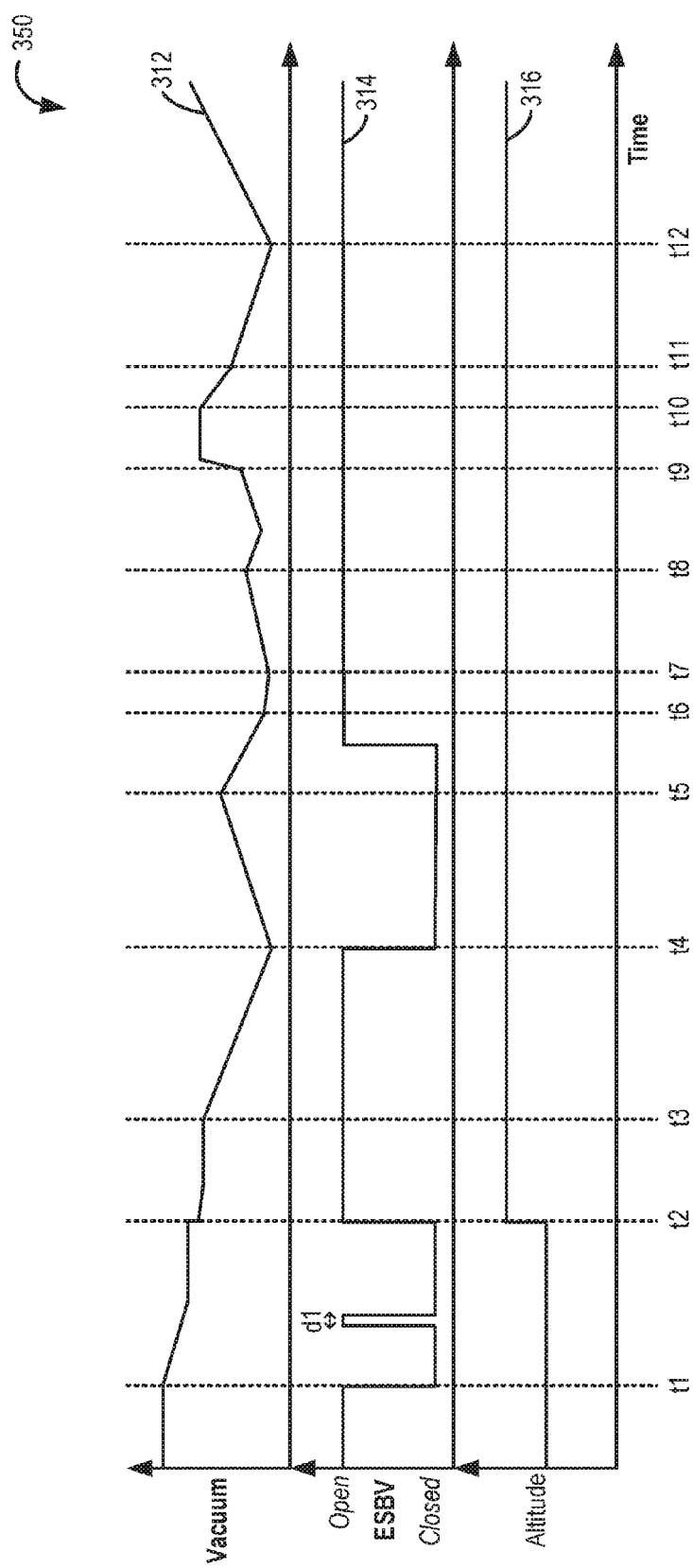

Turning now to FIGS. 3A-3B, an example timeline of boost pressure control using the coordinated operation of a wastegate valve (WG) with ESBV control and electric supercharger speed control is shown at example maps 300 and 350. The horizontal axis (x-axis) denotes time and the vertical markers t1-t12 identify significant times for boost pressure control. Plot 302 shows variation in an accelerator pedal position over time, relative to a variation in brake pedal position (dashed line 303). Plot 304 shows variation in boost pressure over time. Plot 306 variation of a turbocharger turbine speed over time. Plot 308 shows changes in wastegate opening over time. When opened, a wastegate allows exhaust gas to bypass the turbine of the turbocharger, thus decreasing the speed of the turbocharger turbine. Plot 310 shows variation of an electric supercharger compressor speed. Plot 312 shows changes in the level of vacuum available in a vacuum source coupled to the wastegate and a brake booster. Plot 314 shows changes in the position of an electric supercharger bypass valve (ESBV) coupled across the electric supercharger. The ESBV is opened to allow intake air to bypass the electric supercharger or closed to direct air through the electric supercharger. Plot 316 shows changes to an altitude of vehicle operation.

Prior to time t1, the engine is operating without boost (plot 304) due to a lower driver demand (plot 302). Therefore the wastegate is maintained open (plot 308) since exhaust flow through the turbine is not required. In addition, the electric supercharger (ES) is not operated (plot 310) and the ESBV is opened (plot 314) so that intake airflow bypasses the ES. The vacuum level (plot 312) in the vacuum source at this time is high since no vacuum actuators are actuated. In addition, the altitude of vehicle operation is higher (plot 316).

At time t1, the operator tips in, moving the engine from engine operation with natural aspiration to engine operation with boost. The engine boost pressure may be increased in response to the pedal tip-in event by actuating an electric motor to increase the electric supercharger speed. At the same time, the ESBV is closed to route more air through the supercharger compressor. At the same time, the wastegate opening is reduced to flow more exhaust through the turbocharger turbine and expedite turbine spin-up. Actuation of the vacuum actuated wastegate results in a small drop in vacuum level at the vacuum source. By operating the smaller electric supercharger compressor in response to the pedal tip-in event, the boost pressure can be rapidly increased to meet the driver demand while the turbine spins up. As such, if the electric supercharger compressor were not spun, due to the delay in turbine spin-up, there may have been a turbo lag (delay in the actual boost pressure reaching the desired boost pressure), as depicted at dashed plot 305. In particular, by operating the electric supercharger, the desired boost pressure is provided by t2, in comparison to the turbo lag case where the desired boost pressure is provided around t3.

Between t1 and t2, while flowing compressed air to the engine via the electric supercharger, boost pressure may overshoot. In particular, the aggressive electric supercharger operation which reduces the turbo lag can also result in the actual boost pressure downstream of the supercharger compressor transiently exceeding the desired boost pressure. To address this boost pressure overshoot, the ESBPV is opened (fully opened in the depicted example) for a duration d1, to direct airflow to the engine while bypassing the supercharger. Opening the ESBPV may decrease the amount of airflow passing through and being compressed by the supercharger compressor, thereby decreasing the boost pressure provided by the electric supercharger substantially immediately. Simultaneously, the electric supercharger speed may be reduced to better match the desired boost pressure. Because adjusting the ESBV opening may result in a substantially immediate decrease in boost pressure during supercharger overshoot, the ESBV may be actuated with a higher than default gain tuning as the electric supercharger is accelerated (from time t1 to t2). Due to actuation of the ESBV with higher than default gain tuning, the supercharger overshoot is reduced in degree and duration. As such, in the absence of ESBV adjustments, a larger and longer boost pressure overshoot may occur, as shown at dotted line 311. This longer and larger boost pressure overshoot could cause excess torque to be delivered, resulting in drivability issues. At the end of duration d1, the electric supercharger overshoot has been reduced by ESBV actuation, so the ESBV is closed. In addition, since the turbine is still not sufficiently spun up, flowing of compressed air to the engine via the electric supercharger is continued.

It will be appreciated that while the ESBV is depicted as an on/off valve movable between a fully open and a fully closed position, in an alternate example, the ESBV may be a variable valve whose position is adjustable to any position between and including the fully opened and fully closed positions. In such a case, the ESBV opening may be increased responsive to the boost pressure overshoot so that a specific amount of airflow may bypass the electric supercharger during over-boost, such that a resultant boost pressure is equivalent to the desired boost pressure. The electric supercharger compressor speed may be adjusted to the desired compressor speed, responsive to boost error, and the ESBV opening may be adjusted to maintain the resultant boost pressure at the desired boost pressure.

At time t2, the turbocharger turbine speed reaches a desired turbine speed, at which it may provide the desired boost pressure without assistance from the electric supercharger. Once the turbine is sufficiently spun up, the wastegate may be actuated to increase the opening, the wastegate actuated with a higher (than default) gain tuning to maintain the boost pressure. The actuation may result in another drop in vacuum level at the vacuum source. In order to conserve electric supercharger battery charge, once the turbine is spun up, the ESBV is opened, and the electric supercharger is decelerated. Thereafter, compressed air may be flowed into the engine to meet the driver boost demand via the turbocharger compressor, without requiring electric boost assist from the supercharger.

Also at t2, the vehicle moves to a higher altitude, which results in a drop in barometric pressure and thereby a corresponding drop in the available vacuum in the vacuum source.

Between t2 and t3, the driver demand drops, but boost pressure is still required. Since the turbine is already spun up, the wastegate is actuated more open to reduce the turbine speed while providing the boost demand via the turbocharger compressor. Actuation of the wastegate causes the vacuum level to drop further.

At t3, the vehicle reaches a downhill segment and during the downhill travel (from t3 to t4), the accelerator pedal is released while the brake pedal (plot 303) is depressed. Due to actuation of the brake pedal, a brake booster is actuated which uses a significant amount of vacuum from the vacuum source. In addition, the wastegate is actuated more open so that more exhaust flow bypasses the turbine. Consequently, responsive to drop in driver demand, the boost pressure is reduced. At the end of the downhill segment, at t4, the vacuum level in the vacuum source is low.

At t4, the vehicle reaches an uphill segment and the operator tips in to request boost. In response to the boost demand, the turbine needs to be spun up to drive the turbocharger compressor, for which the wastegate needs to be actuated closed. However, due to depletion of vacuum during the preceding braking event, and the added low vacuum level at the higher altitude, there is insufficient vacuum reserve in the vacuum source for actuating the wastegate closed. Specifically, there is only enough vacuum available for partial wastegate actuation, as depicted at dashed segment 309. As such, if the limited vacuum were used to partially actuate the wastegate, the resulting transient boost response would result in less than the desired boost pressure being provided, and a turbo lag until t7, as indicated at dashed segment 305.

To improve the transient boost response, between t4 and t5, the wastegate is maintained open and boost is not provided via the turbocharger. Instead, the transient boost demand is met by actuating the supercharger. Specifically, the ESBV is actuated closed to increase airflow through the ES compressor while the output of the electric motor coupled to the ES is increased to accelerate the ES compressor. Both the ES and ESBV are operated with the higher than default gain tuning during this time so as to meet the boost demand more aggressively. As a result, between t4 and t5, the ES is accelerated rapidly and used to meet the driver demand. In the meantime, the vacuum source is replenished.

At t5, the vacuum source is replenished to a level where there is sufficient vacuum for the required amount of wastegate actuation. Consequently at t5, the wastegate is actuated closed and the turbine starts to spin up. At this time the wastegate is operated with the higher than default gain tuning so as to meet the boost demand more aggressively. While the turbine is spinning up, the ES is continued to be operated (with the ES output maintained) and the ESBV is maintained closed so as to use electric boost assist to meet the boost demand. In some examples (not depicted), as the turbine increases, the ES output may be decreased. Shortly before t6, the turbine speed reaches a threshold speed wherefrom the turbine is able to spin the turbocharger compressor and support the boost demand. At this time, the ESBV is opened so that air flows to the turbocharger compressor while bypassing the ES, and the ES is disabled by discontinuing operation of the electric motor. As a result, the ES decelerates and the boost demand is now met via the turbocharger compressor.

At t6, the boost demand is met after the turbine has spun up. Thereafter the wastegate continues to be controlled with the higher gain tuning, with the wastegate actuated more open once the turbine has spun up.

At t7, the driver demand drops again but boost is still required. This is met by further opening the wastegate while continuing to use the turbocharger compressor to provide boost pressure, and with the ES still disabled and the ESBV still open.

At t8, there is another tip-in resulting in an engine transition from a lower boosted condition to a higher boosted condition. Responsive to the increase in boost demand, the turbocharger turbine speed is increased by decreasing the wastegate opening, the wastegate actuated at a higher than default gain tuning. Since the turbine is already spun-up at this time, the supercharger compressor may be maintained disabled. Between t8 and t9, changes in boost demand are met via the turbocharger using corresponding adjustments to wastegate position with the higher than default gain tuning. Between t9 and t10, the vacuum source is replenished with vacuum such that by t10, the vacuum levels are elevated again.

At t10, there is another downhill segment at the higher altitude and the accelerator pedal is released while the brake pedal is depressed. The brake actuation results in vacuum usage. At t11, there is an uphill segment where the accelerator pedal is depressed while the brake pedal is released and due to the tip-in, boost demand increases. At this time, however, there is sufficient vacuum available for the required wastegate actuation. Consequently, the wastegate is actuated closed and the turbine is quickly spun up to meet the driver demand. Since boost assist is not required, the ES is maintained disabled and the ESBV is maintained open.

At t12, once the turbine speed is sufficiently high to drive the turbocharger compressor, the wastegate opening is increased and the vacuum source is replenished with vacuum for future use.

In this way, responsive to a first increase in driver demand, a controller may maintain a first, upstream compressor disabled, the first compressor driven by an electric motor; while closing a wastegate valve coupled in a wastegate passage across an exhaust turbine; and accelerate a second, downstream compressor to meet a driver demand, the second compressor driven by the turbine. In comparison responsive to a second increase in driver demand, the controller may open the wastegate valve; and accelerate the first compressor to meet the driver demand. In one example, during the first increase in driver demand, an ambient pressure is higher, while during the second increase in driver demand, the ambient pressure is lower. Herein, the wastegate valve is actuated using vacuum from a vacuum source, and at a time of the first increase in driver demand, a vacuum level in the vacuum source is higher while at the time of the second increase in driver demand, the vacuum level in the vacuum source is lower. The controller may additionally or optionally, during the second increase in driver demand, accelerate the first compressor with the wastegate valve open until the vacuum level in the vacuum source is higher than a threshold, and then decelerate the first compressor, close the wastegate valve, and accelerate the second compressor. Thereafter, the driver demand is met via the second compressor. The controller may additionally or optionally, during the first increase in driver demand, open a bypass valve coupled in a bypass across the first compressor, and during the second increase in driver demand, close the bypass valve. Further, during the second increase in driver demand, the accelerating the first compressor and the closing the bypass valve may be performed with a higher than default gain tuning including operating the electric motor with a higher output for a longer duration. As used herein, accelerating the second compressor includes driving the second compressor via the turbine, the turbine spun using exhaust flow, the exhaust mass flow through the turbine increased by closing of the wastegate valve.

In this way, transient boost response at higher altitudes is met more accurately and rapidly by coordinating adjustments to an electric supercharger speed and an associated bypass valve with adjustments to a wastegate valve. The technical effect of coordinating adjustments to an electric supercharger staged upstream of a turbocharger with adjustments to an exhaust wastegate valve when vacuum availability is low is that electric boost may be used to meet a driver demand while the vacuum source is replenished. By relying on an electric supercharger bypass valve to reduce boost pressure overshoot, an electric supercharger may be operated more aggressively while a turbocharger turbine spins up. By operating the bypass valve and the supercharger compressor (and associated electric motor) more aggressively when wastegate actuation is not possible, boost pressure can be provided while vacuum is replenished for wastegate actuation. In addition, operation with partial wastegate actuation at higher altitudes is reduced. By improving the time to torque, engine transient boost response is improved, including during an uphill tip-in following downhill braking at higher altitudes. Further, by coordinating the supercharger speed and bypass valve adjustments in the complementary frequency band as wastegate adjustments, a wastegate control loop may be tuned more aggressively without degrading boost accuracy.

One example method for a vehicle with a boosted engine comprises: in response to an increase in driver demand, accelerating a first compressor staged upstream of a second compressor to provide a flow of compressed air to a piston engine, the first compressor driven by an electric motor, the second compressor driven by a turbine; and adjusting operation of the first compressor adjusted based on an altitude of vehicle operation. In the preceding example, additionally or optionally, the method further comprises, during the accelerating, closing a bypass valve coupled in a bypass across the first compressor to increase air flow through the first compressor. In any or all of the preceding examples, additionally or optionally, the method further comprises, while accelerating the first compressor, holding a wastegate valve coupled in a wastegate passage across the turbine in a more open position. In any or all of the preceding examples, additionally or optionally, the method further comprises, in response to a boost pressure overshoot while accelerating the first compressor, intermittently opening the bypass valve while maintaining the wastegate valve closed. In any or all of the preceding examples, additionally or optionally, the wastegate valve is coupled to a vacuum source, and wherein the accelerating of the first compressor is continued until a vacuum level in the vacuum source is above a threshold. In all or all of the preceding examples, additionally or optionally, the threshold is based on the altitude of vehicle operation, the threshold lowered as the altitude increases. In any or all of the preceding examples, additionally or optionally, the method further comprises, after the vacuum level in the vacuum source is above the threshold, decelerating the first compressor, opening the bypass valve, and actuating the wastegate valve to a less open position, a degree of opening of the wastegate valve based on the increase in driver demand. In any or all of the preceding examples, additionally or optionally, the method further comprises, opening the wastegate valve with a higher than default gain tuning while accelerating the first compressor. In any or all of the preceding examples, additionally or optionally, adjusting operation of the first compressor based on the altitude includes operating the first compressor with a higher than default gain tuning when the altitude is higher and with the default gain tuning when the altitude is lower. In any or all of the preceding examples, additionally or optionally, operating the first compressor with a higher than default gain tuning when the altitude is higher includes one or more of operating the electric motor with a higher output, operating the electric motor for a longer duration, accelerating the first compressor with a higher rate of acceleration, and accelerating the first compressor to a higher speed at the higher altitude.

Another example method for a boosted engine comprises: responsive to a first increase in driver demand, maintaining a first, upstream compressor disabled, the first compressor driven by an electric motor; closing a wastegate valve coupled in a wastegate passage across an exhaust turbine; and accelerating a second, downstream compressor, the second compressor driven by the turbine; and responsive to a second increase in driver demand, opening the wastegate valve; and accelerating the first compressor. In the preceding example, additionally or optionally, during the first increase in driver demand, an ambient pressure is higher, and wherein during the second increase in driver demand, the ambient pressure is lower. In any or all of the preceding examples, additionally or optionally, the wastegate valve is actuated using vacuum from a vacuum source, and wherein at a time of the first increase in driver demand, a vacuum level in the vacuum source is higher and at the time of the second increase in driver demand, the vacuum level in the vacuum source is lower. In any or all of the preceding examples, additionally or optionally, the method further comprises, during the second increase in driver demand, accelerating the first compressor with the wastegate valve open until the vacuum level in the vacuum source is higher than a threshold, and then decelerating the first compressor, closing the wastegate valve, and accelerating the second compressor. In any or all of the preceding examples, additionally or optionally, the method further comprises, during the first increase in driver demand, opening a bypass valve coupled in a bypass across the first compressor, and during the second increase in driver demand, closing the bypass valve. In any or all of the preceding examples, additionally or optionally, during the second increase in driver demand, the accelerating the first compressor and the closing the bypass valve is performed with a higher than default gain tuning including operating the electric motor with a higher output for a longer duration.

Another example engine system comprises: an engine having an intake; a first intake compressor driven by an electric motor, the motor powered by a battery; a second intake compressor driven by an exhaust turbine, the second compressor positioned downstream of the first compressor along the intake; a bypass including a bypass valve coupled across the first compressor; a wastegate including a vacuum-actuated wastegate valve coupled across the exhaust turbine, the wastegate valve coupled to a vacuum source; a barometric pressure sensor for estimating an ambient pressure; and a controller. The controller may be configured with computer readable instructions stored on non-transitory memory for: in response to driver demand when the ambient pressure is lower, estimating a wastegate valve actuation required to meet the driver demand; estimating a vacuum level in the vacuum source required to provide the wastegate valve actuation, the vacuum level estimated based on the driver demand and further based on the ambient pressure; accelerating the first compressor with the wastegate valve not actuated and the bypass valve closed to meet the driver demand until the vacuum source is above the estimated vacuum level; and then decelerating the first compressor, opening the bypass valve, and actuating the wastegate valve. In the preceding examples, additionally or optionally, accelerating the first compressor includes feed-forward and feed-back adjusting an operation of the electric motor with a higher than default gain tuning to increase an output of the electric motor to a higher level for a longer duration, and wherein actuating the wastegate valve includes actuating the wastegate valve to a more closed position. In any or all of the preceding examples, additionally or optionally, the controller includes further instructions for: in response to driver demand when the ambient pressure is higher, accelerating the first compressor with the bypass valve closed and the wastegate valve actuated open to meet the driver demand until a turbine speed is above a threshold speed; and then decelerating the first compressor, opening the bypass valve, and increasing a speed of the second compressor with the wastegate closed to increase airflow to the engine. In any or all of the preceding examples, additionally or optionally, the controller includes further instructions for: in response to a boost pressure overshoot while accelerating the first compressor, intermittently opening the bypass valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with a boosted engine, comprising:
   in response to an increase in driver demand,
      accelerating a first compressor staged upstream of a second compressor to provide a flow of compressed air to a piston engine, the first compressor driven by an electric motor, the second compressor driven by a turbine;
      adjusting operation of the first compressor based on an altitude of vehicle operation,
      during the accelerating, closing a bypass valve coupled in a bypass across the first compressor to increase air flow through the first compressor;
      while accelerating the first compressor, holding a wastegate valve coupled in a wastegate passage across the turbine in a more open position; and
      in response to a boost pressure overshoot while accelerating the first compressor, intermittently opening the bypass valve while maintaining the wastegate valve closed.

2. The method of claim 1, wherein the wastegate valve is coupled to a vacuum source, and wherein the accelerating of the first compressor is continued until a vacuum level in the vacuum source is above a threshold.

3. The method of claim 2, wherein the threshold is based on the altitude of vehicle operation, the threshold lowered as the altitude increases.

4. The method of claim 2, further comprising, after the vacuum level in the vacuum source is above the threshold, decelerating the first compressor, opening the bypass valve, and actuating the wastegate valve to a less open position, a degree of opening of the wastegate valve based on the increase in driver demand.

5. The method of claim 4, further comprising opening the wastegate valve with a higher than default gain tuning while accelerating the first compressor.

6. The method of claim 1, wherein adjusting operation of the first compressor based on the altitude includes operating the first compressor with a higher than default gain tuning when the altitude is higher and with the default gain tuning when the altitude is lower.

7. The method of claim 6, wherein operating the first compressor with a higher than default gain tuning when the altitude is higher includes one or more of operating the electric motor with a higher output, operating the electric motor for a longer duration, accelerating the first compressor with a higher rate of acceleration, and accelerating the first compressor to a higher speed at the higher altitude.

8. A method for a boosted engine, comprising:
   responsive to a first increase in driver demand, maintaining a first, upstream compressor disabled, the first compressor driven by an electric motor; closing a wastegate valve coupled in a wastegate passage across an exhaust turbine; and accelerating a second, downstream compressor, the second compressor driven by the turbine; and
   responsive to a second increase in driver demand, opening the wastegate valve; and accelerating the first compressor.

9. The method of claim 8, wherein during the first increase in driver demand, an ambient pressure is higher, and wherein during the second increase in driver demand, the ambient pressure is lower.

10. The method of claim 8, wherein the wastegate valve is actuated using vacuum from a vacuum source, and wherein at a time of the first increase in driver demand, a vacuum level in the vacuum source is higher and at the time of the second increase in driver demand, the vacuum level in the vacuum source is lower.

11. The method of claim 10, further comprising, during the second increase in driver demand, accelerating the first compressor with the wastegate valve open until the vacuum level in the vacuum source is higher than a threshold, and then decelerating the first compressor, closing the wastegate valve, and accelerating the second compressor.

12. The method of claim 8, further comprising, during the first increase in driver demand, opening a bypass valve coupled in a bypass across the first compressor, and during the second increase in driver demand, closing the bypass valve.

13. The method of claim 12, wherein during the second increase in driver demand, the accelerating the first compressor and the closing the bypass valve is performed with a higher than default gain tuning including operating the electric motor with a higher output for a longer duration.

14. An engine system, comprising:
an engine having an intake;
a first intake compressor driven by an electric motor, the motor powered by a battery;
a second intake compressor driven by an exhaust turbine, the second compressor positioned downstream of the first compressor along the intake;
a bypass including a bypass valve coupled across the first compressor;
a wastegate including a vacuum-actuated wastegate valve coupled across the exhaust turbine, the wastegate valve coupled to a vacuum source;
a barometric pressure sensor for estimating an ambient pressure; and
a controller with computer readable instructions stored on non-transitory memory for:
in response to driver demand when the ambient pressure is lower,
estimating a wastegate valve actuation required to meet the driver demand;
estimating a vacuum level in the vacuum source required to provide the wastegate valve actuation, the vacuum level estimated based on the driver demand and further based on the ambient pressure;
accelerating the first compressor with the wastegate valve not actuated and the bypass valve closed to meet the driver demand until the vacuum source is above the estimated vacuum level; and
then decelerating the first compressor, opening the bypass valve, and actuating the wastegate valve.

15. The system of claim 14, wherein accelerating the first compressor includes feed-forward and feedback adjusting an operation of the electric motor with a higher than default gain tuning to increase an output of the electric motor to a higher level for a longer duration, and wherein actuating the wastegate valve includes actuating the wastegate valve to a more closed position.

16. The system of claim 14, wherein the controller includes further instructions for:
in response to driver demand when the ambient pressure is higher,
accelerating the first compressor with the bypass valve closed and the wastegate valve actuated open to meet the driver demand until a turbine speed is above a threshold speed; and
then decelerating the first compressor, opening the bypass valve, and increasing a speed of the second compressor with the wastegate closed to increase airflow to the engine.

17. The system of claim 14, wherein the controller includes further instructions for:
in response to a boost pressure overshoot while accelerating the first compressor, intermittently opening the bypass valve.

* * * * *